D. J. ANGUS.
VAPORIZER.
APPLICATION FILED OCT. 18, 1916.
1,357,922.
Patented Nov. 2, 1920.
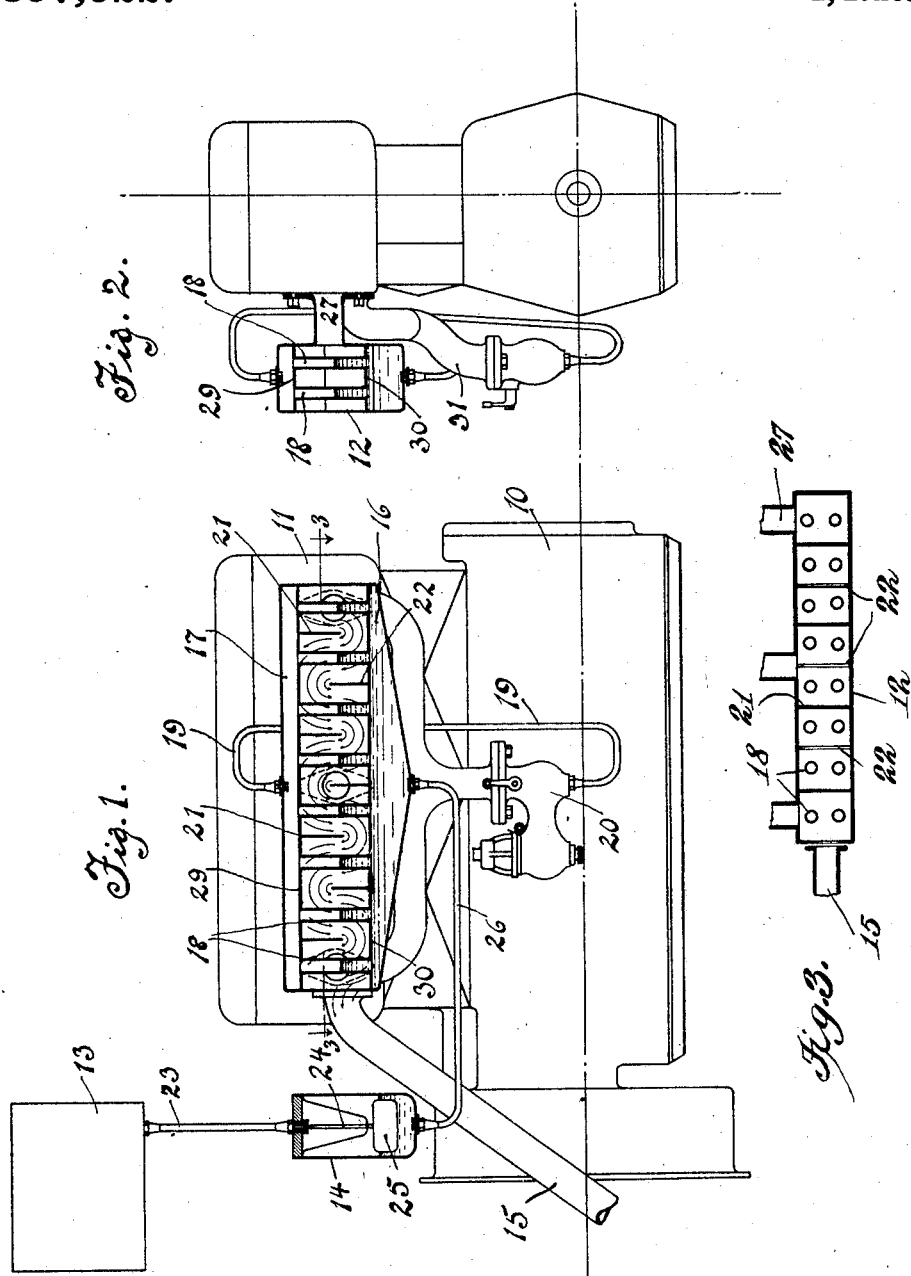
INVENTOR
Donald J. Angus
BY
Bedford & Doolittle
ATTORNEYS

UNITED STATES PATENT OFFICE.

DONALD J. ANGUS, OF INDIANAPOLIS, INDIANA, ASSIGNOR TO JOHN W. ESTERLINE AND DONALD J. ANGUS, BOTH OF INDIANAPOLIS, INDIANA, A PARTNERSHIP DOING BUSINESS UNDER THE FIRM-NAME OF ESTERLINE & ANGUS.

VAPORIZER.

1,357,922.   Specification of Letters Patent.   Patented Nov. 2, 1920.

Application filed October 18, 1916. Serial No. 126,347.

*To all whom it may concern:*

Be it known that I, DONALD J. ANGUS, a citizen of the United States, residing at Indianapolis, Marion county, and State of Indiana, have invented and discovered certain new and useful Improvements in Vaporizers, of which the following is a specification.

My invention consists in an improved construction of gas generators designed particularly for generating gas from oil, and adapted for use in connection with internal combustion engines, whereby the heat from the exhaust from the engine may be utilized to generate fuel gas from ordinary heavy oils. The invention has for its further purpose to economize space and to utilize the heat of the exhaust at its highest temperature and in a manner to extract the maximum amount of heat therefrom, thereby imparting to the generator the highest possible degree of efficiency.

Referring to the accompanying drawings, which are made a part hereof, and on which similar reference characters indicate similar parts, Figure 1, is a side elevation of the exhaust side of an internal combustion engine with a generator of my improved construction attached thereto, the generator being shown in longitudinal section, and Fig. 2 an end elevation thereof, the generating chamber being shown in cross section.

Fig. 3 is a horizontal section taken on line 3—3 of Figs. 1 and 2.

In said drawings, the portions marked 10 represent the base or frame, and 11 the cylinder casing of an internal combustion engine, which may be of any ordinary or approved type, 12 is the generator, 13 a fuel oil supply tank and 14 a float chamber.

The generating chamber 12 is a box-like structure of substantially the length of the engine, and adapted to fit on the exhaust side thereof, and be connected thereto in the place of the usual exhaust manifold. At its rear end it is connected with an exhaust pipe 15 of the usual construction. Said generator is divided by a flue formed by horizontal plates 29 and 30 into two compartments, a lower compartment 16 for containing the fuel oil, and an upper compartment 17 for the gas. The two compartments are connected to communicate with each other by a series of tubes 18. A fuel gas supply pipe 19 leads from the top of the compartment 17 to the mixing valve or carbureter 20, from which the fuel is supplied to the intake manifold 31 in the usual manner. A series of baffle-plates 21 depend from the upper plate 29 of the flue between chambers 16 and 17, positioned mid-way between alternate pairs of the tubes 18. Like baffle-plates 22 project upward from the bottom plate 30 of said flue in the other spaces between said tubes, thus insuring a serpentine passage for the heat through said flue and that a maximum amount of the heat units in the exhaust will be utilized in the generating operation. It will be noted that the exhaust pipes 27 from the engine cylinders are connected in parallel with the flue thereby utilizing, to the full value, the heat units of the exhaust gases.

The oil supply tank 13 is connected with the float tank 14 by a pipe 23, the outlet to which is controlled by a valve 24 mounted on a float 25 in said tank 14. Float tank 14 is connected with the lower side of chamber 16 of generator 12 by a pipe 26. The oil will flow freely from supply tank 13 into float tank 14 and from the float tank 14 into chamber 16 of the generator until the oil in the generator reaches a level slightly below the tubes, when the float 25 will normally operate to close valve 24 and shut off the supply. When the engine is running the vacuum in the mixing valve will operate to lift the fuel into the tubes, which present a heated vaporizing surface sufficient to supply gas as required by the engine. When the consumption of gas by the engine falls off the pressure in chamber 17, caused by the generation of the gases, will press backward upon the oil depress its level, and lift the float 25 and close valve 24, shutting off the supply.

The operation of this device will be readily understood from the foregoing description. The exhaust from the engine coming into the generator 12 through the exhaust ports 27 passes lengthwise of the generator casing in contact with the tubes 18, heating said tubes and causing the vaporization of the oil therein. The gas generated rises into chamber 17 and passes through pipe 19 to the mixing valve or carbureter 20, and from thence to the intake manifold. It will be readily understood that as the consumption of gas increases in the operation of the engine, the oil in tubes 18 will rise bringing it into contact with larger areas of heated tube surfaces, and thus increase the generation of the gas. When the consumption of gas in chamber 17 decreases, the gas will accumulate in said chamber, causing a back pressure, and lowering the column of oil in said tubes, thus decreasing the volume of generation. The supply is thus in a measure automatically controlled by the consumption, and the oil supply is fed to the generator only so fast as may be required by the demands of the engine. It will also be noted that the generator serves the twofold purpose of an exhaust manifold, as well as an oil gas generator, thus utilizing space as well as employing the heat of the exhaust for a useful purpose.

By this apparatus ordinary heavy oils may be automatically converted into gas of a very efficient character and great economy in the operation of this type of engine is thus effected.

Having thus fully described my said invention, what I claim as new and desire to secure by Letters Patent, is:

1. The combination with a multi-cylinder internal combustion engine, of a fuel vaporizer therefor mounted on the exhaust side of said engine and providing an exhaust manifold extending the length of the engine, said vaporizer comprising a casing having partitions extending the length thereof and forming a lower oil chamber and an upper gas chamber and tubes providing communication between said chambers, a communicating connection between each of the engine cylinders and the vaporizer, an exhaust pipe leading from the vaporizer at one end thereof, an oil supply pipe, and a gas discharge pipe connected with the intake manifold, substantially as set forth.

2. The combination with a multi-cylinder internal combustion engine, of a fuel vaporizer therefor mounted on the exhaust side of said engine and providing an exhaust manifold extending the length of the engine, said vaporizer comprising a casing of rectangular cross section having horizontal partitions extending the entire length thereof and forming a lower oil chamber and an upper gas chamber, and tubes providing communication between said chambers, baffle plates located in said casing providing a tortuous passage-way for the engine exhaust gases, a communicating pipe connection between each of the engine cylinders and the vaporizer, an exhaust pipe leading from the vaporizer at one end thereof, an oil supply pipe, and a gas discharge pipe, substantially as set forth.

In witness whereof, I have hereunto set my hand and seal at Indianapolis, Indiana, this 13th day of October, A. D. nineteen hundred and sixteen.

DONALD J. ANGUS. [L. S.]

Witnesses:
E. W. BRADFORD,
E. S. CLEMENTS.